US009014136B2

(12) United States Patent
Roeder et al.

(10) Patent No.: US 9,014,136 B2
(45) Date of Patent: Apr. 21, 2015

(54) SYSTEM AND METHOD TO PROVIDE FAST WIDE-AREA MOBILE IP HANDOFFS

(75) Inventors: G. R. Konrad Roeder, Bellevue, WA (US); John Stromseth, Bellevue, WA (US); Sukhjinder Singh, Bellevue, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 588 days.

(21) Appl. No.: 12/250,372

(22) Filed: Oct. 13, 2008

(65) Prior Publication Data

US 2010/0091732 A1 Apr. 15, 2010

(51) Int. Cl.
H04W 4/00 (2009.01)
H04W 36/00 (2009.01)
H04W 80/04 (2009.01)

(52) U.S. Cl.
CPC .......... *H04W 36/0033* (2013.01); *H04W 80/04* (2013.01)

(58) Field of Classification Search
CPC .................................................... H04W 48/20
USPC .......................................................... 370/331
See application file for complete search history.

(56) References Cited

U.S. PATENT DOCUMENTS

| 7,764,640 | B2* | 7/2010 | Lee et al. | 370/328 |
| 7,801,078 | B2* | 9/2010 | Kim et al. | 370/331 |
| 7,839,832 | B2* | 11/2010 | Molteni et al. | 370/338 |
| 2004/0066757 | A1* | 4/2004 | Molteni et al. | 370/329 |
| 2004/0066759 | A1* | 4/2004 | Molteni et al. | 370/329 |
| 2006/0128385 | A1* | 6/2006 | Lee et al. | 455/436 |
| 2006/0159048 | A1* | 7/2006 | Han et al. | 370/331 |
| 2006/0187896 | A1* | 8/2006 | Jung | 370/349 |
| 2006/0193272 | A1* | 8/2006 | Chou et al. | 370/310 |
| 2007/0002833 | A1* | 1/2007 | Bajic | 370/352 |
| 2007/0097921 | A1* | 5/2007 | Choi et al. | 370/331 |
| 2007/0171910 | A1* | 7/2007 | Kumar | 370/392 |
| 2007/0197238 | A1* | 8/2007 | Nakajima | 455/466 |
| 2008/0013487 | A1* | 1/2008 | Molteni et al. | 370/329 |
| 2009/0323631 | A1* | 12/2009 | Bajic | 370/331 |
| 2010/0074179 | A1* | 3/2010 | Akiyoshi | 370/328 |

* cited by examiner

*Primary Examiner* — Brandon Renner
*Assistant Examiner* — Faisal Choudhury
(74) *Attorney, Agent, or Firm* — Kenyon & Kenyon LLP

(57) ABSTRACT

A system, device, and method for real-time handoff in a mobile IP network is provided. In an embodiment, an indication that a mobile device is in a new network is sent out more often in a beacon than in an IRDP message in order to provide an effective seamless connectivity between service areas for wireless communications.

49 Claims, 10 Drawing Sheets

SYSTEM AND METHOD TO PROVIDE FAST WIDE-AREA MOBILE IP HANDOFFS

FIELD OF INVENTION

The present invention relates generally to wireless communication, and more particularly to methods, devices and systems for faster layer 3 handoff across different layer 3 networks to minimize communication disruption period when moving between access points and/or to enable seamless handoff over wide geographical networks.

BACKGROUND

The Internet essentially consists of several protocols, of which Transmission Control Protocol (TCP) and Internet Protocol (IP) are commonly used protocols. IP, for example, requires the location of any node connected to the network to be assigned a unique IP address. IP was created on the assumption that a single assigned IP address was sufficient to enable a node to access the Internet. The introduction of mobile nodes, which today include portable computers, cellular telephones, media players, and other mobile devices, introduced a challenge that IP did not address, namely, the situation when a node moves to a new physical location, it must, pursuant to IP, change its IP address. Mobile Internet Protocol (Mobile IP or MIP), among others, was created to address this challenge. Mobile IP is a standard communications protocol designed by the Internet Engineering Task Force (IETF) and enables mobile nodes to remain connected to a network regardless of their locations and without changing their respective IP addresses.

Mobile IP enables node mobility by binding the mobile node's home address to a care-of address. The home IP address and the care-of address are maintained in specialized routers called mobility agents. There are two types of mobility agents: home agents and foreign agents. The home agent is a router in a home network associated with the mobile node which maintains the mobility binding in a mobility binding table. Foreign agents are specialized routers on the foreign network visited by the mobile node. The foreign agent maintains a visitor list which contains information about the mobile nodes currently visiting that network. Typically, the care-of address is the foreign agent's IP address. Mobility agents advertise their presence and availability to mobile nodes by periodically (for instance, once every three seconds) broadcasting an IRDP (Internet Control Message Protocol (ICMP) Router Discovery Protocol) message listing one or more care-of addresses which, when received by a mobile node, may result in the mobile node requesting registration with the home agent. The mobile node receives an IRDP message from the new foreign agent in order to determine that it has roamed on a new network and before it can register with the home agent via the foreign agent. Since IRDP messages are sent periodically (e.g., every three seconds), mobile node users experience service interruptions caused by the inherent registration delays. Once an IRDP message containing the new foreign agent information is received by the mobile node, the mobile node triggers the registration with the home agent via the foreign agent. A successful Mobile IP registration sets up the routing mechanism between the home agent and the mobile node, as the mobile node roams across different networks.

Accordingly, there are problems in the registration of mobile nodes with foreign agents, for example, those that result in slow or latent IP handoffs causing a nonoptimal user experience. Many mobile nodes, such as cellular telephones, in practical use, move rapidly across the physical boundaries of foreign networks. Such mobile nodes are typically engaged in data sessions supporting a variety of user experiences, including, for instance, IP-based voice communications, or VoIP. VoIP generally requires its end-to-end delay to be lower than 250 ms, delay variance or jitter lower than 50 ms, and packet loss rate less than 1%. The currently available handoff process utilizing IRDP cannot satisfy the requirements of real-time interactive application because the communication disruption period is too long and the long communication disruption causes packet loss. Thus, a mobile node user engaged in a data session can experience service interruption or even loss of service if the mobile node moves into a new network or region area.

Further, building out an entire network using layer 2 has scalability issues such as broadcasts, multicasts and slow spanning tree convergence. Some very large layer 2 networks have been built, but eventually there is an upper limit to the number of nodes that can be deployed in the same layer 2 network. Similarly, building out the entire network using layer 3 involves latency issues due to the fact that routers do their work in software and not in hardware. An available method mixes layers 2 and 3. In practical application, approximately sixty to ninety nodes are bundled into a regional layer 2 network, or region. An intra-region handoff is via layer 2 and inter-region handoffs require both a layer 2 and a layer 3 handoff.

SUMMARY OF THE INVENTION

Embodiments of the present invention provide effectively seamless wireless communication between different regions. Further embodiments of the present invention provide methods, devices and systems for fast layer 3 handoff to minimize communication disruption period which occurs when a mobile node moves away from its current access point associated with a first mobility agent and to a new access point associated with a second mobility agent.

Embodiments of the present invention include methods, devices, and systems for completing rapid foreign IP registration, thus permitting a rapid, seamless handoff of mobile node registration between foreign networks. To accomplish effectively seamless real-time handoff or rapid handoff in a Mobile IP network, an embodiment of the present invention provides a system and method for expediting the handover process across layer 3 boundaries. In an embodiment, the handover process speeds up the mobile IP registration process across layer 3 boundaries for network deployments such as linear meshes for trains and subways, and two-dimensional meshes like metro Wi-Fi and access point or mesh deployments in airports, hotel complexes, malls, large buildings and stadiums. In an embodiment, the handover process speeds up the mobile IP registration process from one conventional access point on one network to another conventional access point on another network.

Rapid registration with a home agent is an essential requirement for VoIP and other real time data services like video and audio streaming, and video conferencing. Because the IRDP messages rarely change, in an embodiment, the care-of-address and/or some other parameters from the most recent IRDP message are stored. Further, those parameters are sent in management packets of any wireless or wired networks that are sent more often than the IRDP messages such as beacons and probe responses in 802.11. Since the mobile node must read the beacon or probe response as part of a layer 2 handoff, that information is then used to expedite the agent discovery process which triggers the mobile IP registration which is part of the layer 3 handoff. Such embodiments provide for faster handovers for real-time applications such as UMA calls, voice over IP calls, video applications, etc. in milliseconds rather than seconds, and fewer dropped sessions. Also, data applications such as web browsing, FTP, audio streaming also have enhanced performance during handoffs.

An embodiment of the present invention provides a method and a system performed via an access point for facilitating rapid handoffs in a mobile network, including: receiving at least one service availability advertisement; extracting service availability content from the at least one service availability advertisement; appending the service availability content into at least one rapidly repeated management packet transmission; and transmitting the appended rapidly repeated management packet transmission. In an embodiment, the appended rapidly repeated management packet is transmitted more frequently than the at least one service availability advertisement is received. In an embodiment, the service availability content includes at least one of: an address of a foreign agent, a Registration Lifetime, a number of Care of Addresses, at least one Care of Address, a home agent flag, and a foreign agent flag. In an embodiment, the at least one service availability advertisement includes an Internet Control Message Protocol Router Discovery Protocol (IRDP) message. In an embodiment, the mobile network is a Mobile Internet Protocol (IP) network and the rapid handoffs occur via Layer 3. In an embodiment, the at least one rapidly repeated management packet is one of a beacon message and a probe response. In an embodiment, the at least one service availability advertisement is received from a layer 2 region. In an embodiment, the at least one service availability advertisement indicates soon-entry from a first layer 2 region to a second layer 2 region, the first and second layer 2 regions being different.

An embodiment of the present invention provides a method and system performed via a mobile node for facilitating rapid handoffs in a mobile network, including: receiving a management packet having service availability content; extracting the service availability content from the management packet; composing a network registration message based upon the extracted service availability content; and transmitting the network registration message. In an embodiment, the management packet is one of a beacon message and a probe response. In an embodiment, the facilitating of rapid handoffs occurs via Layer 3 of a Mobile IP network. In an embodiment, the service availability content includes at least one of: an address of a foreign agent, a Registration Lifetime, a number of Care of Addresses, a Care of Address, a home agent flag, and a foreign agent flag. In an embodiment, the service availability content includes an IRDP message.

An embodiment of the present invention provides a method and system for facilitating rapid Layer 3 handoffs in a mobile Internet Protocol (IP) network, including: providing an access point; and providing a mobile node, the mobile node being initially connected to a different access point. The access point receives at least one service availability advertisement; extracts service availability content from the at least one service availability advertisement; appends the service availability content into at least one rapidly repeated management packet transmission; and transmits the appended rapidly repeated management packet transmission. The appended rapidly repeated management packet is transmitted more frequently than the at least one service availability advertisement is received. The mobile node receives the appended management packet transmission, extracts the service availability content from the appended management packet transmission; composes a network registration message based upon the extracted service availability content; and transmits the network registration message. In an embodiment, the at least one service availability advertisement indicates soon-entry from a first layer 2 region to a second layer 2 region, the second layer 2 being associated with the access point, the first and second layer 2 regions being different. In an embodiment, after the mobile node receives the appended management packet transmission, the at least one rapidly repeated management packet is validated by the mobile node. In an embodiment, the service availability content includes at least one of: an address of a foreign agent, a Registration Lifetime, a number of Care of Addresses, at least one Care of Address, a region indicator integer, a home agent flag, and a foreign agent flag. In an embodiment, the region indicator integer is stored in an object identifier preprogrammed in the associated access point via the at least one service availability advertisement. The region indicator integer may represent a specific region of coverage by the associated access point. In an embodiment, the appending of the service availability content into at least one rapidly repeated management packet transmission includes generating a new field in a management frame of the management packet, the new field being populated with the IRDP message. In an embodiment, the at least one service availability advertisement includes an Internet Control Message Protocol Router Discovery Protocol (IRDP) message. In an embodiment, the at least one rapidly repeated management packet is one of a beacon message and a probe response. In an embodiment, the access point transmits IRDP messages at a further reduced rate. In an embodiment, after the mobile node receives the appended management packet transmission, validating the at least one rapidly repeated management packet by the mobile node including: identifying an SSID and a Care of Address in a management frame of the management packet, confirming that the SSID is valid, confirming that the Care of Address is an available Care of Address, wherein if both the SSID and Care of Address are successfully confirmed, then the composing of the network registration message includes generating the SSID and the Care of Address into a new service availability advertisement which is transmitted as the network registration message. In an embodiment, if at least one of the SSID is confirmed as invalid and the Care of Address is confirmed as unavailable, then the mobile node discards the management packet. In an embodiment, the transmission of the network registration message involves a registration of location by the mobile node with a home agent of the mobile node via the access point. In an embodiment, after the access point extracts service availability content from the at least one service availability advertisement, then the service availability content is stored in a table. In an embodiment, the table is at least one of local to the access point, remote to the access point, and may be composed of a plurality of tables. In an embodiment, after the mobile node receives the appended management packet transmission, the at least one rapidly repeated management packet is validated by the mobile node including: identifying an SSID and a region indicator integer in a management frame of the management packet, confirming that the SSID is valid, and confirming that the region indicator integer identifies a new region, wherein the new region associated with the new region indicator integer is different than a current region of the mobile node. In an embodiment, if both the SSID and the region indicator integer are successfully confirmed, then the mobile node uses the region indicator integer to retrieve service availability content associated with the region indicator integer from the table. In an embodiment, the retrieved service availability content is used to generate a new service availability advertisement to be sent to the mobile node. In an embodiment, handoff to a new access point in a same region as the mobile node, using the region indicator integer, is effected before handoff to a new access point in a different region than the mobile node.

An embodiment of the present invention provides a method and system performed via an access point for facilitating real-time layer 3 handoff in a mobile IP network, including: receiving a management frame; identifying a Service Set Identifier (SSID) and a Care of Address within the management frame; confirming that the SSID is valid; confirming that the Care of Address is available; appending the valid SSID and the available Care of Address into a beacon message; and transmitting the appended beacon message. In an embodiment, the appended beacon message is transmitted more frequently than the receipt of the management frame. In an embodiment, the appended beacon message is received by a mobile node.

An embodiment of the present invention provides a system and method for facilitating rapid layer 3 handoff in a mobile IP network, including; a mobile node; a first access point in a first region, the mobile node being connected to the first access point and having an associated first strength of connection; a second access point in a second region, wherein upon approaching the second region, the mobile node: scans for the second access point, the second access point broadcasting one of a beacon and a probe response so that the scanning mobile node identifies the second access point, the one of the beacon and the probe response being broadcasted at shorter time intervals than an IRDP advertisement, determines a potential second strength of connection with the second access point, compares the first strength of connection with the potential second strength of connection, and if the first strength of connection is less than the potential second strength of connection, then the mobile node changes connection from the first access point to the second access point. In an embodiment, the mobile node scans for the second access point when the first strength of connection reaches a predetermined level. In an embodiment, one of the beacon and probe response has a frame header and a frame body. In an embodiment, the frame header includes a source and destination Medium Access Control (MAC) addresses. In an embodiment, the frame body includes at least one of a Service Set Identifier (SSID), a timestamp, a transmission interval, a parameter set, the parameter set including IRDP message information which had been extrapolated from the IRDP advertisement, a Registration Lifetime, a home agent flag, and a foreign agent flag. In an embodiment, the mobile node changes connection from the first access point to the second access point only upon successful authentication of the SSID.

An embodiment of the present invention provides a system and method for real-time handoff in a mobile IP network, including: an access point; and a mobile node. The access point receives at least one service availability communication, extracts service availability content from the at least one service availability communication, appends the service availability content into a management packet, the management packet being one of a beacon message and a probe request, and transmits the appended management packet. The mobile node receives the appended management packet, extracts service availability content from the appended management packet, composes a network registration message based upon the extracted service availability content, and transmits the network registration message to the network. In an embodiment, the at least one service availability communication includes an IRDP message. In an embodiment, after the mobile node receives the appended management packet, the mobile node validates the management packet. In an embodiment, the service availability content includes at least one of: an address of a foreign agent, a Registration Lifetime, a number of Care of Addresses, a Care of Address, a region indicator integer, a home agent flag, and a foreign agent flag. In an embodiment, the region indicator integer is stored in an object identifier preprogrammed in the associated access point via the at least one service availability advertisement. The region indicator integer represents a specific region of coverage by the associated access point. In an embodiment, the appending of the service availability content into a management packet includes generating a new field in a management frame of the management packet, the new field being populated with the IRDP message. In an embodiment, the access point transmits IRDP messages at a further reduced rate to prevent congestion, and a plurality of access points are deployed at and near region boundaries. In an embodiment, after the mobile node receives the appended management packet transmission, the at least one rapidly repeated management packet is validated by the mobile node including: identifying an SSID and a Care of Address in a management frame of the management packet, confirming that the SSID is valid, and confirming that the Care of Address is an available Care of Address. In an embodiment, if both the SSID and Care of Address are successfully confirmed, then the composing of the network registration message includes generating the SSID and the Care of Address into a new service availability advertisement which is transmitted as the network registration message. In an embodiment, if at least one of the SSID is confirmed as invalid and the Care of Address is confirmed as unavailable, then the mobile node discards the management packet. In an embodiment, the transmission of the network registration message involves a registration of location by the mobile node with a home agent of the mobile node via the access point. In an embodiment, after the access point extracts service availability content from the at least one service availability advertisement, then the service availability content is stored in a table, the table being at least one of local to the access point, remote to the access point, and composed of a plurality of tables. In an embodiment, after the mobile node receives the appended management packet transmission, the at least one rapidly repeated management packet is validated by the mobile node including: identifying an SSID and a region indicator integer in a management frame of the management packet, confirming that the SSID is valid, confirming that the region indicator integer identifies a new region, wherein the new region associated with the new region indicator integer is different than a current region of the mobile node, wherein if both the SSID and the region indicator integer are successfully confirmed, then the mobile node uses the region indicator integer to retrieve service availability content associated with the region indicator integer from the table. In an embodiment, the retrieved service availability content is used to generate a new service availability advertisement to be sent to the mobile node. In an embodiment, handoff to a new access point in a same region as the mobile node, using the region indicator integer, is effected before handoff to a new access point in a different region than the mobile node.

An embodiment of the present invention provides for a system and method for real-time handoff in a mobile IP network when a management frame is received by a mobile node, including: a mobile node; a management frame associated with a management packet received by the mobile node, wherein: the mobile node determines whether the management frame includes a valid Service Set Identifier (SSID) and an available new Care of Address (CoA); the mobile node generates a new IRDP message upon determining that the management frame includes the valid SSID and the available new CoA; and the mobile node transmits the new IRDP message to at least one mobile router, wherein the mobile router initiates a registration process after receiving the new IRDP message.

DETAILED DESCRIPTION

Figure 1:
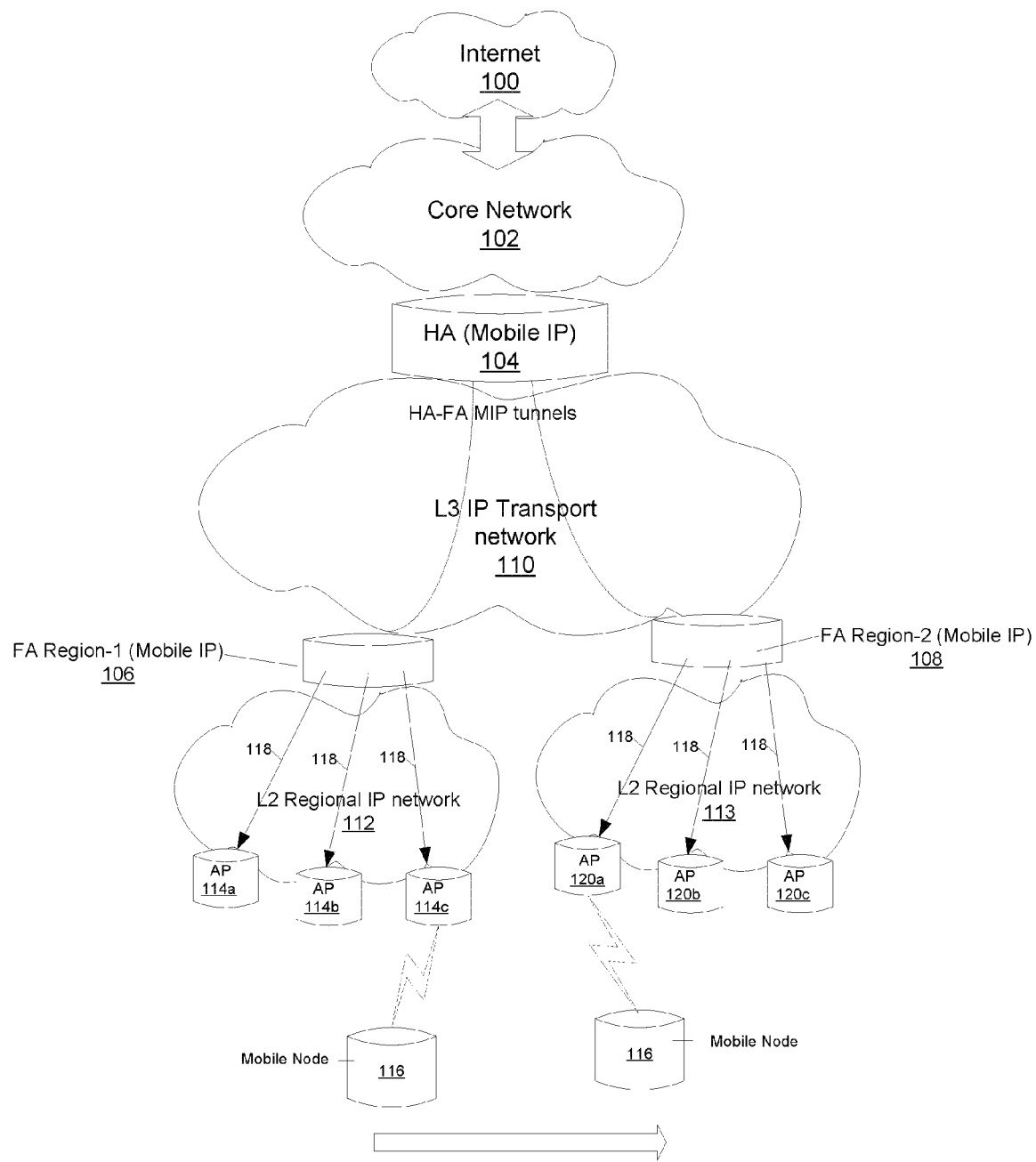
FIG. 1 shows a mobile IP group for handover in a mobile communication system.

The following description provides specific details for a thorough understanding of, and enabling description for, various embodiments of the technology. One skilled in the art will understand that the technology may be practiced without many of these details. In some instances, well-known structures and functions have not been shown or described in detail to avoid unnecessarily obscuring the description of the embodiments of the technology. It is intended that the terminology used in the description presented below be interpreted in its broadest reasonable manner, even though it is being used in conjunction with a detailed description of certain embodiments of the technology. Although certain terms may be emphasized below, any terminology intended to be interpreted in any restricted manner will be overtly and specifically defined as such in this Detailed Description section.

Embodiments of the present invention provides methods, devices and systems for performing fast layer 3 handovers of wireless service between access points of IP-based wireless networks.

Embodiments of the present invention relates to wireless communications devices and wireless communication systems. The former are referred to here as mobile nodes, such as laptop computers, cellular telephones, smart phones, media players and other mobile devices. The latter is referred to here as access points and the network(s) behind them, such as interconnected routers and servers, which provide services such as data communications to mobile nodes. Various inventive concepts of the invention are embodied in mobile nodes and access points, as well as methods used therein for providing a handoff of data communications services between nodes of a wireless network through a system of IRDP messages advertised by foreign agents as the user roams across various geographic domains.

As discussed above, Mobile IP provides an IP-based mobility solution that allows mobile nodes to maintain network connectivity while retaining their home network IP addresses. For example, it enables the node mobility to be transparent to all executing applications by providing the node with a care-of-address that can be registered with a home agent, thereby ensuring that packets are quickly forwarded to the mobile's current location in the foreign network.

Mobility binding is maintained by specialized routers known as mobility agents, either home agents and foreign agents. The home agent is a designated router in the mobile node's home network, and maintains a mobility binding table in which each entry is identified by the tuple <permanent home address, temporary care-of address, association lifetime>. Foreign agents are specialized routers on the foreign network that the mobile node is visiting. The foreign agent maintains a visitor list containing information about the mobile nodes visiting the foreign network. Each entry in the visitor list is identified by the tuple: <permanent home address, home agent address, media address of the mobile node, association lifetime>. The care-of address is usually the foreign agent's IP address.

Mobile IP includes three sub processes. First, a mobile node must discover its foreign and home agents during agent discovery. Mobility agents advertise their availability to mobile nodes by periodically broadcasting IRDP messages. An IRDP message includes one or more care-of addresses and a flag indicating whether it is a home agent or a foreign agent. When a mobile node enters the mobile agent's network area, it receives the IRDP message broadcasted via one or more access points. Second, the mobile node must register its current location with the foreign agent and home agent during registration. The mobile node determines whether the message is from its own home agent or a foreign agent. If the message is from the mobile node's home network, it operates without any mobility services. If the message is from a foreign agent, however, then the mobile node must register with the foreign agent. This is accomplished by sending a registration request message which includes, among other things, the permanent IP address of the mobile host and the IP address of its home agent. The foreign agent then sends a registration request containing the mobile node's permanent IP address and the foreign agent's IP address to the home agent. When the home agent receives the registration request, it updates the mobility binding by associating the care-of address of the mobile node with its home address. The home agent then sends a registration acknowledgement to the foreign agent. The foreign agent in turn updates its visitor list by inserting the entry for the mobile node and relays the reply to the mobile node. Finally, a reciprocal tunnel is set up by the home agent to the care-of address (current location of the mobile node on the foreign network) to route packets to the mobile node as it roams. The mobile node may engage in data sessions with a correspondent node (e.g., a Website, another mobile node). For instance, a correspondent node may send an IP packet addressed to the permanent IP address of the mobile node. The home agent intercepts the packet and checks its mobility binding table to learn whether the mobile node is visiting a foreign network. The home agent can then route the IP packets to the care-of address by constructing a new IP header that contains the mobile node's care-of address as the destination IP address. The original IP packet is including in the IP packet's payload. The home agent then transmits the packet. When the encapsulated packet reaches the foreign network serving the mobile node, the foreign agent decapsulates the IP packet and learns the mobile node's home address. It then consults its visitor list to learn whether there is an entry for the mobile node. The foreign agent then retrieves the corresponding media or MAC address and relays it to the mobile node. The foreign agent continues serving the mobile node until the granted lifetime expires. If the mobile node wants to continue the service, it has to reissue the Registration Request.

FIG. 1 shows an example of the system architecture utilizing Mobile IP according to a conventional mobile communication system. FIG. 1 shows an Internet 100, a core network 102, home agent (HA) 104, foreign agents (FA) 106, 108, layer 3 (L3) transport network 110, one layer 2 (L2) regional IP network 112 and its access points 114a, 114b, 114c, a second layer 2 (L2) regional IP network 113 and its access points 120a, 120b, 120c, and a mobile node 116. The home agent 104 and the foreign agents 106, 108 run Mobile IP. The home agent 104 rather than routing traffic by subnet or IP address, encapsulates traffic and routes it through the correct foreign agent and layer 2 regional IP network according to the care-of address. Mobile node 116 can be connected to any of access points 114a, 114b, 114c in the same regional network and perform a layer 2 handoff to connect to another access point 114a, 114b, 114c. No layer 3 handoff is required because the relevant access points 114, 114b, 114c are in the same layer 2 network. Mobile node 116 can be associated with, for example, an access point 114a, 114b, 114c in a first regional network 112 and may also perform a layer 2 handoff to connect with, for example, an access points 120a, 120b, 120c in a different regional network 113. In this case, however, a layer 3 handoff must also be completed because a move between one or more access points 114a, 114b, 114c in a first network or region to one or more access points 120a, 120b, 120c in a second network or region are not in the same layer 2 network or region. Embodiments of the present invention provide for an efficient handoff between networks or regions, effecting a layer 3 handoff.

Figure 2A:
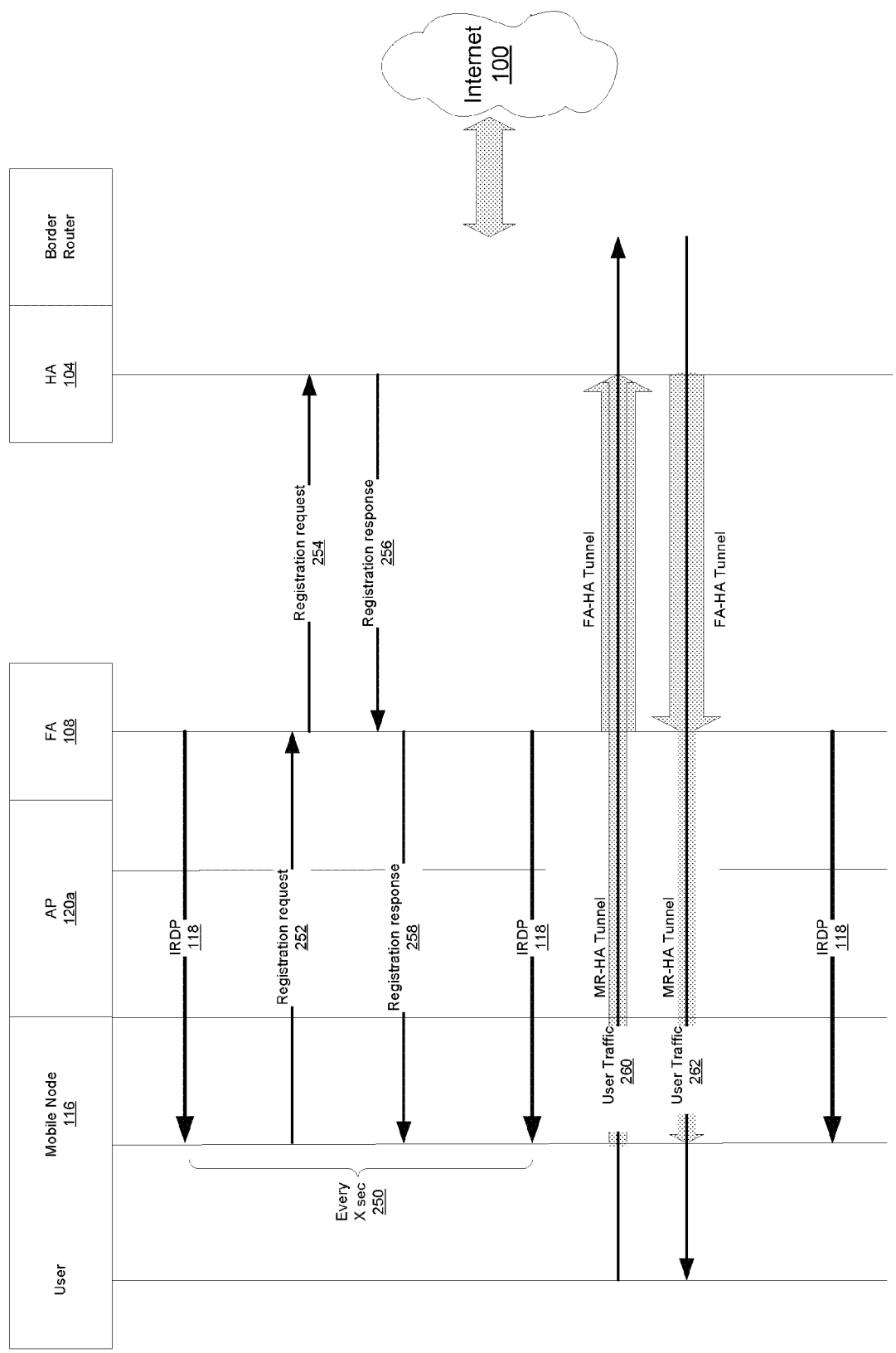
FIG. 2A shows a process flow of a handover message flow in a mobile communication system.
Figure 2B:
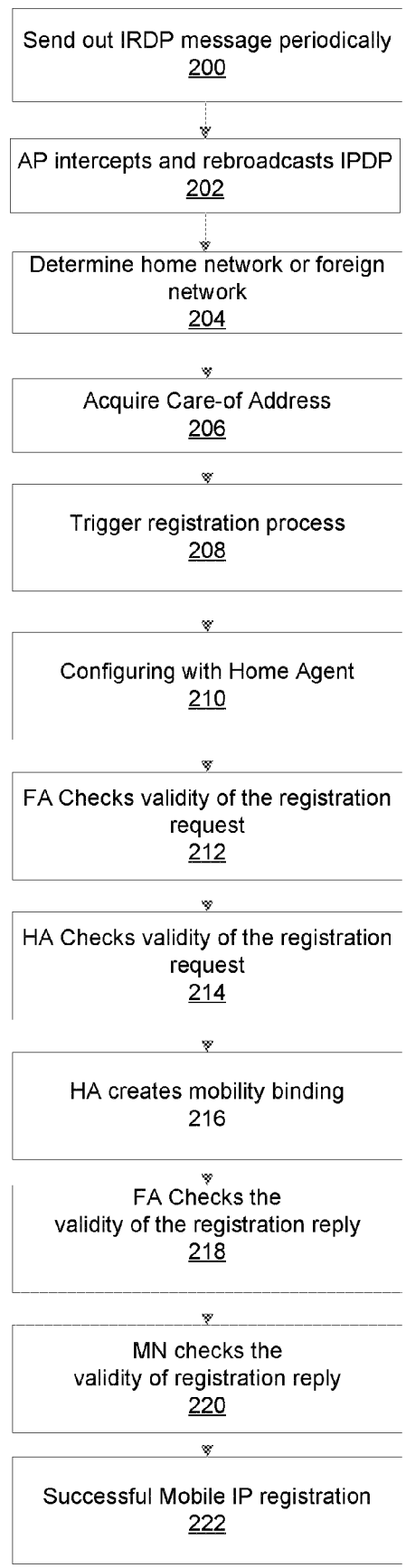
FIG. 2B shows a flowchart of a handover process flow in a mobile communication system.

FIGS. 2A and 2B illustrate flow charts showing a handover process flow in a conventional Mobile IP communication system viewed in conjunction with FIG. 1 for example purposes. During the agent discovery phase, the home agent 104 and foreign agents 106, 108 advertise their services on their respective networks 110, 112, 113 by sending out the ICMP Router Discovery Protocol (IRDP) messages 118 at regular intervals 250 towards the mobile node 116, this interval may be every 3 seconds (Step 200). For example, access point 120a intercepts the IRDP message, stores it and updates the parameters sent out in the beacons that it regularly broadcasts to mobile nodes (Step 202). The mobile node 116 listens to the IRDP message advertisements 118 to determine if it is connected to its home network or foreign network (Step 204). If a mobile node 116 determines that it is connected to a foreign network, it acquires a care-of address (Step 204).

There are two types of care-of addresses: a care-of address acquired from a foreign agent and a colocated care-of address. A foreign agent care-of address is typically an IP address of a foreign agent 106, 108 that has an interface on the foreign network being visited by a mobile node 116. A mobile node 116 that acquires this type of care-of address can share the address with other mobile nodes. A colocated care-of address is an IP address temporarily assigned to the interface of the mobile node 116 itself. A colocated care-of address represents the current position of the mobile node 116 on the foreign network and can be used by only one mobile node 116 at a time. When the mobile node 116 hears a new foreign agent 120a IRDP advertisement and detects that it has moved outside of its home network, it begins registration 252. In an embodiment, once an IRDP message 118 that includes information about a new foreign agent 108 is received by mobile node 116, the mobile node 116 triggers the registration 252 with the home agent 104 via the new foreign agent 108 (Step 208).

The mobile node 116 is configured with the IP address and mobility security association (which includes the shared key) of its home agent 104 (Step 210). Alternatively, the mobile node 116 can be configured with either its home IP address, or another user identifier, such as a network access identifier. The mobile node 116 uses this information along with the information that it learns from the foreign agent 108 IRDP advertisements to form a Mobile IP registration request 252. It adds the registration request to its pending list and sends the registration request to its home agent 104 either through the foreign agent 108 or directly if it is using a colocated care-of address and is not required to register through the foreign agent 108. If the registration request is sent through the foreign agent 108, the foreign agent 108 checks the validity of the registration request (Step 212), which includes checking that the requested lifetime does not exceed its limitations, the requested tunnel encapsulation is available, and that reverse tunnel is supported. If the registration request is valid, the foreign agent 108 adds the visiting mobile node 116 to its pending list before relaying the request 254 to the home agent 104. If the registration request is not valid, the foreign agent 108 sends a registration reply with appropriate error code to the mobile node 116.

The home agent 104 checks the validity of the registration request (Step 214), which includes authentication of the mobile node 116. If the registration request is valid, the home agent 104 creates a mobility binding (Step 216) (an association of the mobile node with its care-of address), a tunnel to the care-of address, and a routing entry for forwarding packets to the home address through the tunnel. The home agent 104 then sends a registration reply 256 to the mobile node 116 through the foreign agent 108 (if the registration request was received via the foreign agent 108) or directly to the mobile node 116. If the registration request is not valid, the home agent 104 rejects the request by sending a registration reply with an appropriate error code.

The foreign agent 108 checks the validity of the registration reply (Step 218), including ensuring that an associated registration request exists in its pending list. If the registration reply 256 is valid, the foreign agent 108 adds the mobile node 116 to its visitor list, establishes a tunnel to the home agent 104, and creates a routing entry for forwarding packets to the home address. It then relays the registration reply 258 to the mobile node 116.

Finally, the mobile node 116 checks the validity of the registration reply (Step 220), which includes ensuring an associated request is in its pending list as well as proper authentication of the home agent 104. If the registration reply is not valid, the mobile node 116 discards the reply. If a valid registration reply specifies that the registration is accepted, the mobile node 116 is confirmed that the mobility agents are aware of its roaming. In the colocated care-of address case, it adds a tunnel to the home agent 104. Subsequently, the mobile node 116 sends all packets to the foreign agent 108.

The mobile node 116 reregisters before its registration lifetime expires. The home agent 104 and foreign agent 108 update their mobility binding and visitor entry, respectively, during re-registration. In the case where the registration is denied, the mobile node 116 makes the necessary adjustments and attempts to register again. For example, if the registration is denied because of time mismatch and the home agent 104 sends back its time stamp for synchronization, the mobile node 116 adjusts the time stamp in future registration requests.

Thus, a successful Mobile IP registration sets up the routing mechanism for transporting packets to and from the mobile node as it roams (Step 222).

During the tunneling process 260, the mobile node 116 sends packets using its home IP address, effectively maintaining the appearance that it is always on its home network. Even while the mobile node is roaming on foreign networks, its movements are transparent to correspondent nodes.

Data packets addressed to the mobile node 116 are routed to its home network, where the home agent 104 now intercepts and tunnels 262 them to the care-of address toward the mobile node 116. Tunneling has two primary functions: encapsulation of the data packet to reach the tunnel endpoint, and de-capsulation when the packet is delivered at that endpoint. The default tunnel mode is IP encapsulation within IP encapsulation. Optionally, GRE and minimal encapsulation within IP may be used. Typically, the mobile node 116 sends packets to the foreign agent 108, which routes them to their final destination.

The first and the slowest part of this three step process is the agent discovery phase. Currently, there is no mechanism described in RFC 1256 by which the mobile node 116 can quickly discover that it is in a new or foreign network. The mobile node 116 has to wait for an IRDP message 118 after it has completed a layer 2 handoff into the new region, before it can complete the layer 3 handoff with Mobile IP. While one could send IRDP messages 118 more often than once every three seconds, this may break RFC 1256's upper limit for how often an IRDP message can be sent and would flood the network with IRDP messages.

In an embodiment of the present invention, a mobile node does not wait until it loses connectivity and/or experiences poor performance to seek alternative access points. In other words, in an embodiment of the present invention, a system is provided such that a mobile node may be proactive to ensure continued optimal performance rather than solely be reactive to perceived poor performance. For example, the scanning for the best candidate access point 120a may be accomplished before breaking the current connection. Therefore, if mobile node 116 is connected to access point 114c and a neighbor access point 120a is available and can provide better link quality than the serving access point 114c, the mobile node may discover and connect with it before the current link quality drops into a very poor status. Thus, when the mobile node 116 finds a preferable access point 120a, the handoff can be completed by detaching from the serving access point 114c and making authentication and new association with the new access point 120a.

In accordance with an embodiment of the present invention, access point management frames carry the contents of the IRDP message corresponding to the foreign agent for the new location. In an embodiment, as soon as access point-mobile node authentication and association are complete, the Mobile IP registration process can begin earlier.

In a standard network using Mobile IP, an access point is responsible for transmitting beacon frames. The area in which beacon frames are transmitted defines the access point's basic service area. All communication in standard network is done through access points, so mobile nodes on the network must be within the access point's service area to receive the access point's beacons. Access points broadcast beacons many times a second in order to allow mobile nodes to quickly find and identify the basic service area.

Figure 3:
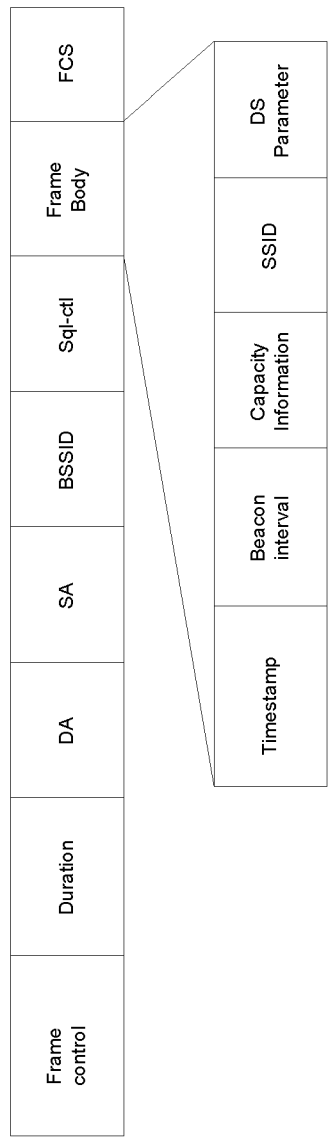
FIG. 3 is a diagram showing a standard access point beacon frame.

FIG. 3 is a diagram showing a standard access point beacon frame. An access point has only a wireless interface, via which all data, control and management frames (including beacon frames) are sent or received, so the BSSID in the beacon frame is the MAC address used by this wireless interface access point, and the current channel, included in the DS parameter field, is just the working channel of this wireless interface.

Figure 4A:
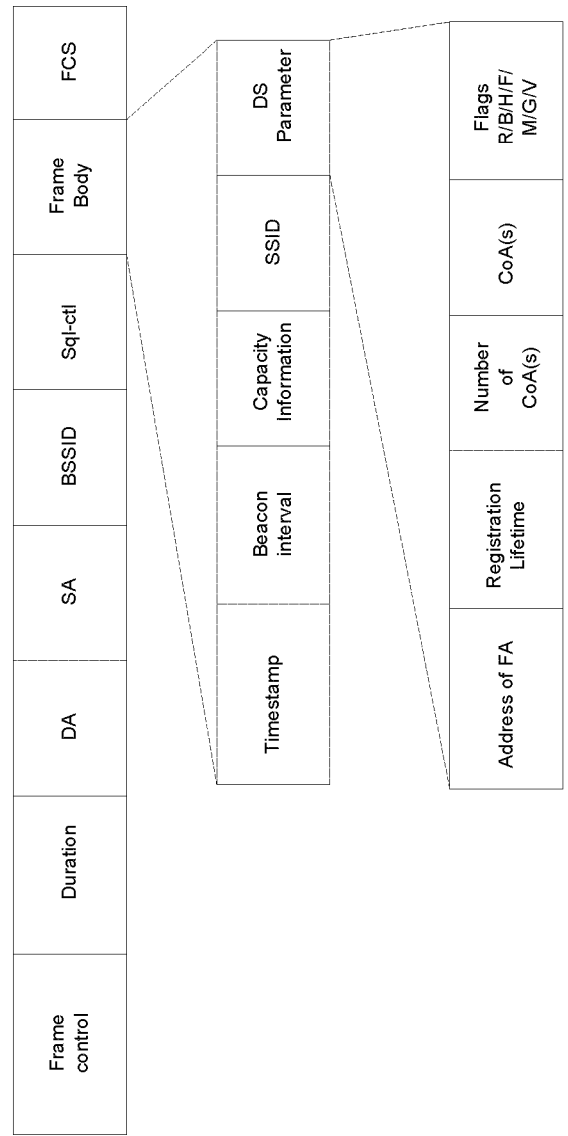
FIG. 4A is a diagram illustrating an example of the updated access point beacon frame according to an embodiment of the invention.

An example beacon frame is approximately fifty bytes long, roughly half of which is comprised by a common frame header and cyclic redundancy checking (CRC) field. As with other frames, the header includes source and destination MAC addresses as well as other information regarding the communications process. The destination address consists entirely of ones, which is the broadcast Medium Access Control (MAC) address. This forces all other stations on the applicable channel to receive and process each beacon frame. The CRC field provides error detection capability. The remainder of the beacon frame resides between the header and the CRC field. Each beacon frame carries the following information in the frame body:

Timestamp
Beacon interval
Capability information
Service Set Identifier (SSID)
DS parameters FIG. 4A is a diagram illustrating an example of the updated access point beacon frame according to an embodiment of the present invention. For the DS parameter field, a new sub-field IRDP beacon is generated and inserted as part of an access point beacon or probe response management frame. This parameter field in the management frame is populated with the IRDP message information extrapolated from an incoming IRDP message. In particular, the parameter field includes the address of the foreign agent, the Registration Lifetime, the number of Care of Address(es), Care of Address(es), and flags R/B/H/F/M/G/V.

Figure 4B:
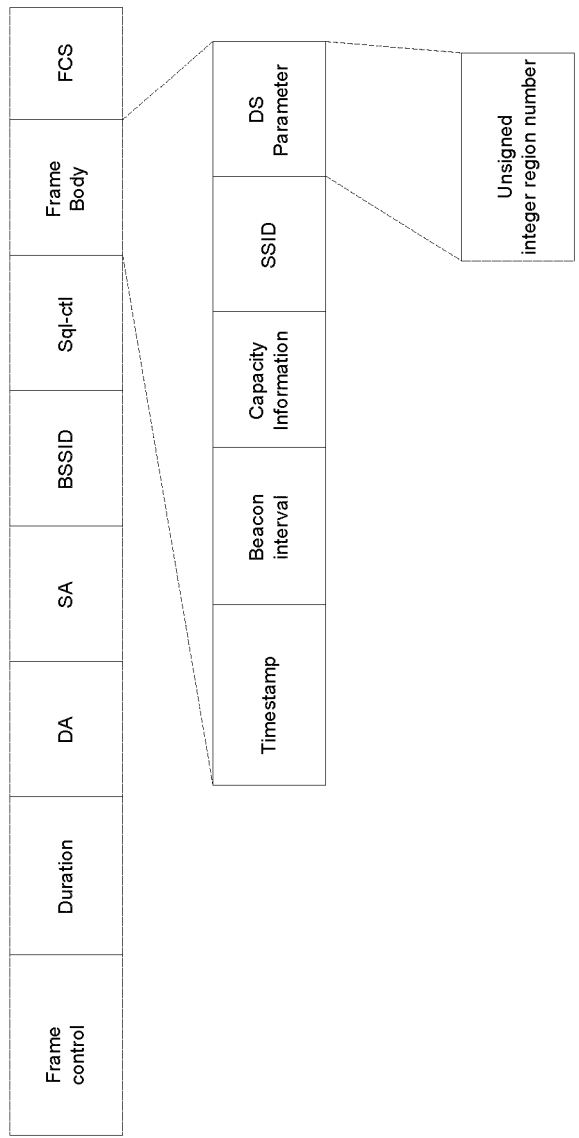
FIG. 4B is a diagram illustrating an example of the updated access point beacon frame according to an embodiment of the present invention.

FIG. 4B is a diagram illustrating an example of the updated access point beacon frame or probe response according to an embodiment of the present invention. For the DS parameter field, a new sub-field IRDP beacon is generated and inserted as part of an access point beacon or probe response management frame. This parameter field in the management frame is populated with an unsigned integer region number. Simultaneously, the region number is stored in a new OID (object identifier) which is programmed into the access point.

In accordance with an embodiment of the present invention, the speed of discovery of new region and the corresponding registration phase may be increased. Towards this end, an access point wireless component can be utilized. An access point management frame can carry the contents of an IRDP message or the representations thereof to the foreign agent for the new location. As soon as the access point authentication and association are complete, the Mobile IP registration process could get started earlier.

Figure 5A:
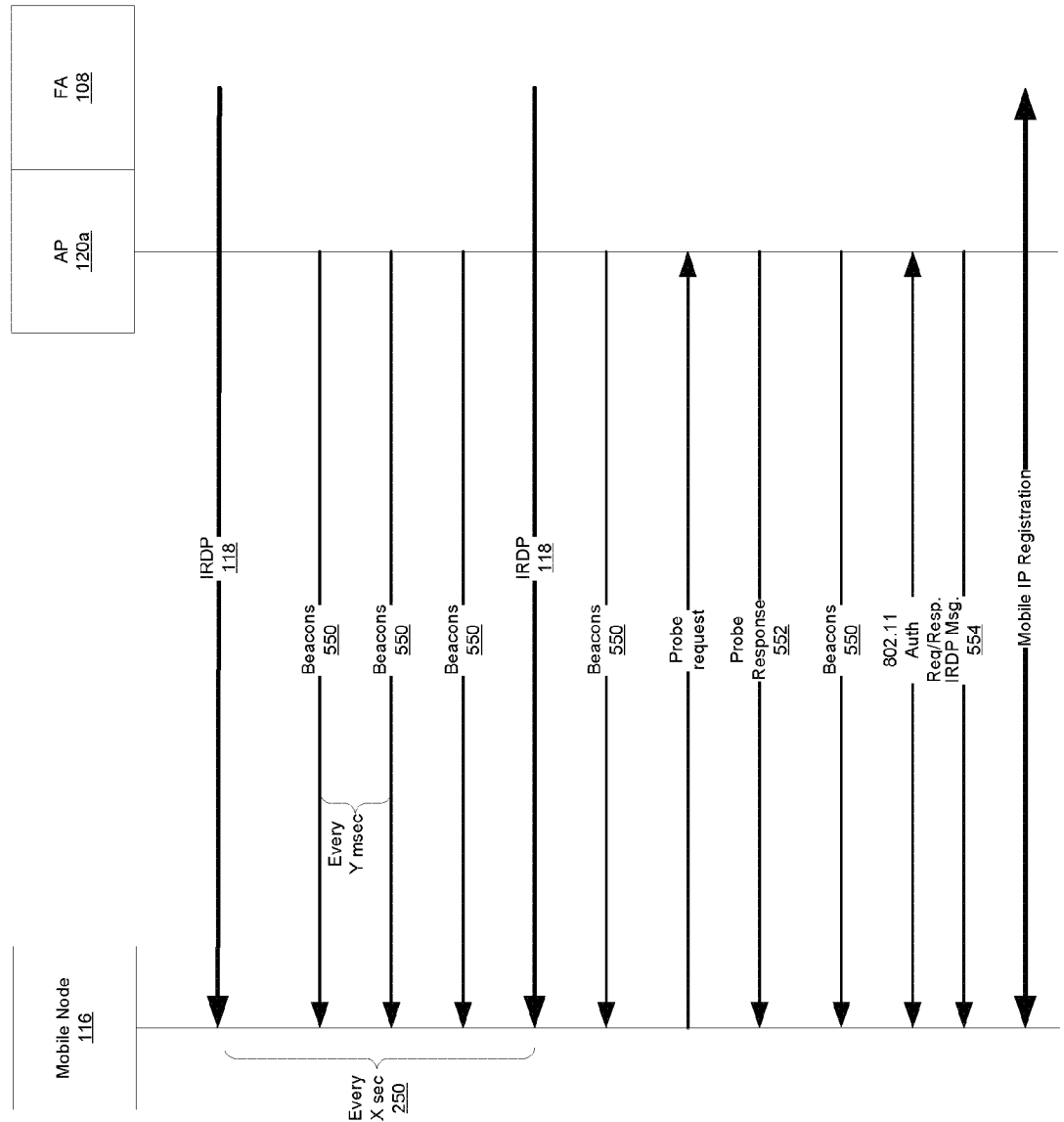
FIG. 5A shows a message flow according to an embodiment of the present invention.
Figure 5B:
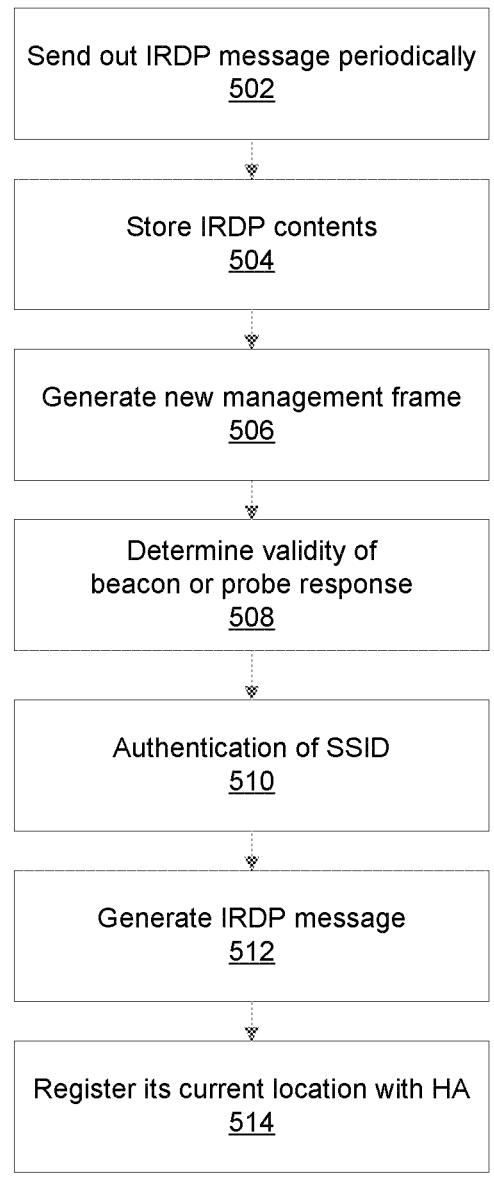
FIG. 5B shows a flow chart of a handover process flow in a mobile communication system according to an embodiment of the present invention.

FIGS. 5A and 5B illustrate process flows in accordance with an embodiment of the present invention. As described in FIGS. 2A and 2B above, IRDP messages 118 are periodically sent between foreign agent 106 and mobile node 116 (Step 502). When an IRDP message 118 is received at a access point 120a, its contents are stored within access point 120a for further processing (Step 504). The information of the IRDP message 118 being stored includes but is not limited to the address of the foreign agent 108, the Registration Lifetime, the Number of Care of Address(es), Care of Address(es) (CoA), and flags R/B/H/F/M/G/V. The access point 120a beacons 550 and probe response 552 traverses the network at a higher frequency compared to IRDP messages, when an access point beacon or probe response needs to be transmitted, a special new field in the management frame is generated and populated with the IRDP message information (Step 506). The message information may include, among other things, the address of the foreign agent 108, the Registration Lifetime, the Number of Care of Address(es), Care of Address(es) (CoA), and flags R/B/H/F/M/G/V.

When an access point management frame is received at an mobile node 116, the mobile node determines the validity of the beacon or probe response (Step 508), which includes ensuring an associated beacon 550 or probe response 552 is in its pending list as well as proper authentication of SSID (Step 510). If the SSID is not valid and/or the management frame does not contain a new CoA, the mobile node 116 discards the beacon or probe response and continues to receive other beacons or probe responses. If a valid SSID is received and the management frame contains a new CoA, the management frame content is generated into a new IRDP message 554 that will be sent to the mobile router as soon as the mobile node 116 is fully associated (Step 512). Alternatively, the newly constructed IRDP message can be transmitted to a mobile node 116 client. Once authentication and association is complete, the new IRDP message 554 can be transmitted to the mobile node 116. Thereafter, the mobile node 116 can register its current location with the home agent 104 via the foreign agent 108 (Step 514).

Figure 6A:
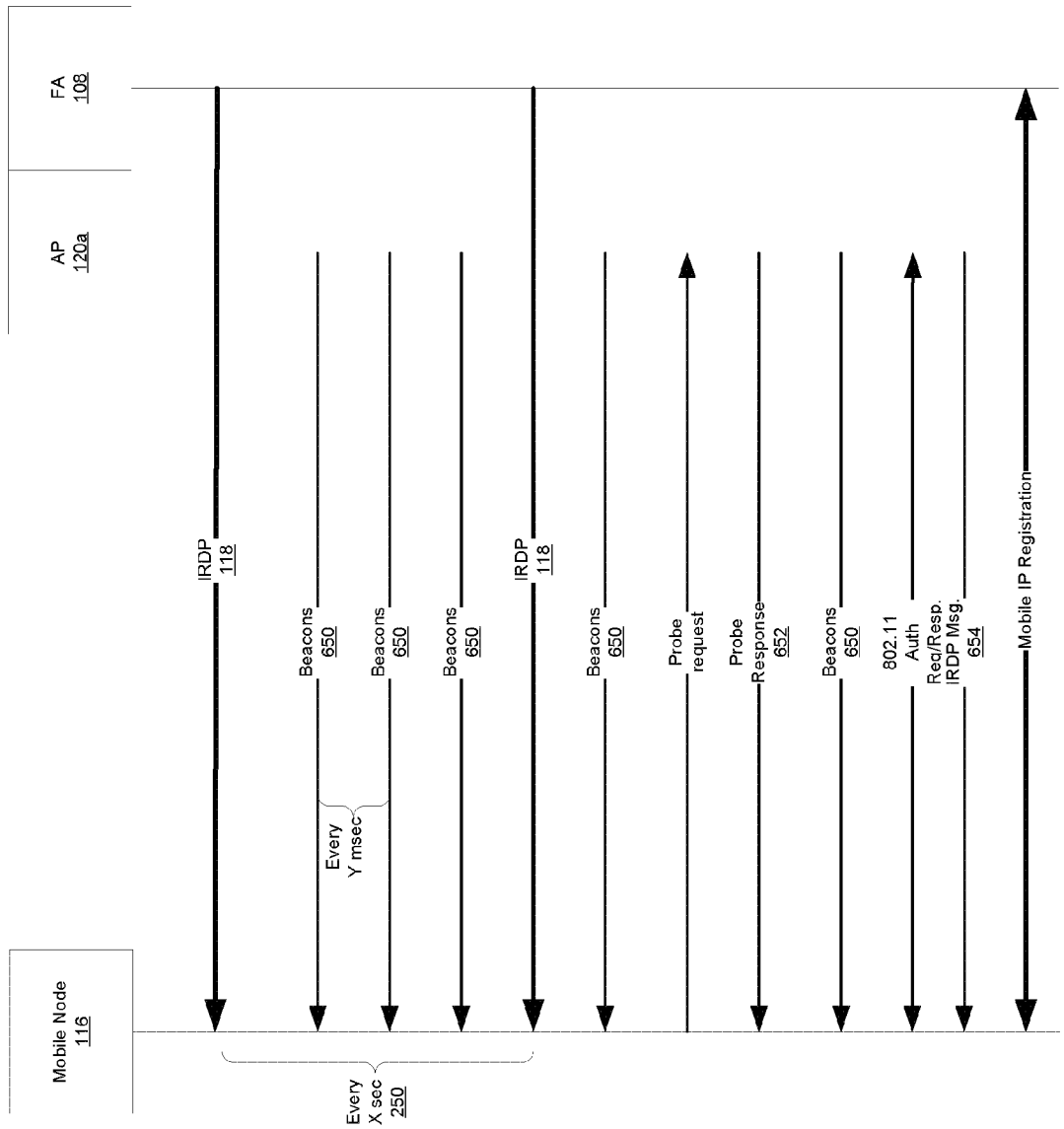
FIG. 6A is a message flow showing a handover process according to an embodiment of the present invention.
Figure 6B:
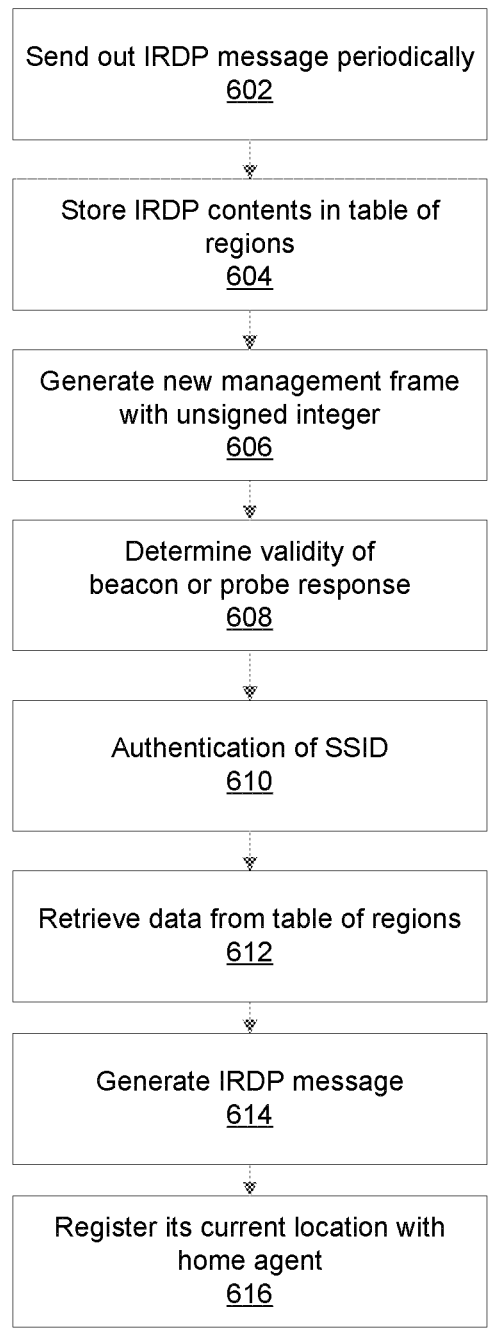
FIG. 6B is a flow chart showing a handover process according to an embodiment of the present invention.

FIGS. 6A and 6B illustrate process flows in accordance with an embodiment of the present invention. In an embodiment, IRDP messages 118 are periodically sent between foreign agent 108 and mobile node 116 (Step 602). When an IRDP message 118 is received at a access point 120a, its contents are stored within a table of regions for further processing (Step 604). In an embodiment, the table may be local or remote from the access point 120a. Specifically, the information of the IRDP message 118 being stored on the table of regions includes but is not limited to the address of the foreign agent 108, the Registration Lifetime, the Number of Care of Address(es), Care of Address(es) (CoA), and flags R/B/H/F/M/G/V. In an embodiment, the use of a table of regions assists in providing a more robust, automated system in providing increased ease of identification of a new region or network.

The access point beacons 650 and probe response 652 traverses the network at a higher frequency compared to IRDP messages, when an access point beacon or probe response needs to be transmitted, a special new field in the management frame is generated and populated with one unsigned integer, wherein the unsigned integer represent a particular region of coverage (Step 606). The region number is stored in a new OID (Object Identifier) which is programmed into the access point 120a. In an embodiment, the OID is preprogrammed into the access point 120a through an IRDP message 118 through foreign agent 108 or home agent 104.

When an access point management frame is received at a mobile node 116, the mobile node determines the validity of the beacon or probe response (Step 608), which includes ensuring an associated beacon 650 or probe response 652 is in its pending list as well as proper authentication of SSID (Step 610). If the SSID is not valid and/or the management frame does not contain a new region indication, the mobile node 116 discards the beacon or probe response and continues to receive other beacons or probe responses. If a valid SSID is received and the management frame contains a new region indication, the region is used by the mobile node 116 to retrieve corresponding data from the table or regions (Step 612). Next, the retrieved contents are used to generate a new IRDP message 654 that will be sent to the mobile node 116 as soon as the mobile node 116 is fully associated (Step 614). Once authentication and association is complete, the new IRDP message 654 can be transmitted to the mobile router 116. Thereafter, the mobile node 116 can register its current location with the foreign agent 108. The foreign agent 108 in turn registers with the home agent 104 (Step 616).

In accordance with an embodiment of the present invention, since the clients rely on the beacons and probe responses rather than the IRDP messages, the rate at which foreign agent 108 send IRDP messages does not have to be every, for example, 3 seconds but can be relaxed to every, for example, 30 seconds. Sending fewer IRDP messages from the foreign agent 108 eases up congestion of the wireless communication networks 110, 112, 113 with IRDP messages.

There are certain situations or embodiments where a mobile node is moving along the regional boundary between two access points. In those situations, for example, the system and method in accordance with an embodiment of the present invention does not need to constantly re-register the mobile node in one region or another. Specifically, hysteresis can be built into the authentication and association phases of a layer 2 handoff. By preferring handing off to access points in the same region, a certain amount of hysteresis can be built into the process.

The features of the embodiments of the present invention may be implemented in hardware, software, firmware, or a combination thereof and utilized in systems, subsystems, components or subcomponents thereof. When implemented in software, the elements of the invention are programs or the code segments used to perform the necessary tasks. The program or code segments can be stored in a machine readable medium or transmitted by a data signal embodied in a carrier wave over a transmission medium or a communication link. The "machine readable medium" may include any medium that can store or transfer information. Examples of a machine readable medium include electronic circuit, semiconductor memory device, ROM, flash memory, erasable ROM (EROM), floppy diskette, CD-ROM, optical disk, hard disk, fiber optic medium, radio frequency (RF) link, etc. The code segments may be downloaded via computer networks such as Internet, Intranet, etc.

Although the invention has been described above with reference to specific embodiments, the invention is not limited to the above embodiments and the specific configurations shown in the drawings. For example, some components shown may be combined with each other as one embodiment, or a component may be divided into several subcomponents, or any other known or available component may be added. The operation processes are also not limited to those shown in the examples. Those skilled in the art will appreciate that the invention may be implemented in other ways without departing from the spirit and substantive features of the invention. The present embodiments are therefore to be considered in all respects as illustrative and not restrictive. The scope of the invention is indicated by appended claims rather than by foregoing description, and all changes that come within the meaning and range of equivalency of the claims are therefore intended to be embraced therein.

What is claimed is:

1. A method for facilitating rapid layer 3 handoffs in a mobile Internet Protocol (IP) network, comprising:
providing an access point; and
providing a mobile node, the mobile node being initially connected to a different access point,
wherein, the access point:

receives at least one service availability advertisement, wherein the at least one service availability advertisement includes an Internet Control Message Protocol Router Discovery Protocol (IRDP) message;

extracts service availability content from the at least one service availability advertisement;

appends the service availability content into at least one rapidly repeated management packet transmission, wherein the appending of the service availability content into at least one rapidly repeated management packet transmission includes generating a new field in a management frame of the management packet, the new field being populated with the IRDP message; and transmits the appended rapidly repeated management packet transmission, the appended rapidly repeated management packet including the IRDP message being transmitted more frequently than the at least one service availability advertisement is received, such that the rapid Layer 3 handoff occurs;

and the mobile node:

receives the appended management packet transmission, extracts the service availability content from the appended management packet transmission;

composes a network registration message based upon the extracted service availability content; and transmits the network registration message without waiting for the IRDP message via a Layer 2 handoff.

2. The method of claim 1, wherein the at least one service availability advertisement indicates soon-entry from a first layer 2 region to a second layer 2 region, the second layer 2 being associated with the access point, the first and second layer 2 regions being different.

3. The method of claim 1, further comprising:

after the mobile node receives the appended management packet transmission, validating the at least one rapidly repeated management packet by the mobile node.

4. The method of claim 1, wherein the service availability content includes at least one of: an address of a foreign agent, a Registration Lifetime, a number of Care of Addresses, at least one Care of Address, a region indicator integer, a home agent flag, and a foreign agent flag.

5. The method of claim 4, wherein the region indicator integer is stored in an object identifier preprogrammed in the associated access point via the at least one service availability advertisement, the region indicator integer representing a specific region of coverage by the associated access point.

6. The method of claim 1, wherein the at least one rapidly repeated management packet is one of a beacon message and a probe response.

7. The method of claim 6, wherein the access point transmits IRDP messages at a further reduced rate.

8. The method of claim 6, further comprising:

after the mobile node receives the appended management packet transmission, validating the at least one rapidly repeated management packet by the mobile node including:

identifying an SSID and a Care of Address in a management frame of the management packet, confirming that the SSID is valid, confirming that the Care of Address is an available Care of Address, wherein if both the SSID and Care of Address are successfully confirmed, then the composing of the network registration message includes generating the SSID and the Care of Address into a new service availability advertisement which is transmitted as the network registration message.

9. The method of claim 8, wherein if at least one of the SSID is confirmed as invalid and the Care of Address is confirmed as unavailable, then the mobile node discards the management packet.

10. The method of claim 8, wherein the transmission of the network registration message involves a registration of location by the mobile node with a home agent of the mobile node via the access point.

11. The method of claim 1, further comprising:

after the access point extracts service availability content from the at least one service availability advertisement, then storing the service availability content in a table, the table being at least one of local to the access point, remote to the access point, and composed of a plurality of tables.

12. The method of claim 11, further comprising:

after the mobile node receives the appended management packet transmission, validating the at least one rapidly repeated management packet by the mobile node including:

identifying an SSID and a region indicator integer in a management frame of the management packet, confirming that the SSID is valid, confirming that the region indicator integer identifies a new region, wherein the new region associated with the new region indicator integer is different than a current region of the mobile node, wherein if both the SSID and the region indicator integer are successfully confirmed, then the mobile node uses the region indicator integer to retrieve service availability content associated with the region indicator integer from the table.

13. The method of claim 12, wherein the retrieved service availability content is used to generate a new service availability advertisement to be sent to the mobile node.

14. The method of claim 12, wherein handoff to a new access point in a same region as the mobile node, using the region indicator integer, is effected before handoff to a new access point in a different region than the mobile node.

15. A system for facilitating rapid layer 3 handoff in a mobile IP network, comprising:

a mobile node;

a first access point in a first region, the mobile node being connected to the first access point and having an associated first strength of connection;

a second access point in a second region, wherein upon approaching the second region, the mobile node:

scans for the second access point, the second access point broadcasting one of a beacon and a probe response so that the scanning mobile node identifies the second access point, the one of the beacon and the probe response being broadcasted at shorter time intervals than an IRDP advertisement, wherein the second access point:

receives at least one service availability advertisement, wherein the at least one service availability advertisement includes an Internet Control Message Protocol Router Discovery Protocol (IRDP) message;

extracts service availability content from the at least one service availability advertisement;

appends the service availability content into at least one rapidly repeated management packet transmission, wherein the appending of the service availability content into at least one rapidly repeated management packet transmission includes generating a new field in a management frame of the management packet, the new field being populated with the IRDP message; and transmits the appended rapidly repeated management packet transmission, the appended rapidly repeated management packet including the IRDP message being transmitted more frequently than the at least one service availability advertisement is received, such that the rapid Layer 3 handoff occurs;

determines a potential second strength of connection with the second access point, compares the first strength of connection with the potential second strength of connection, and if the first strength of connection is less than the potential second strength of connection, then the mobile node changes connection from the first access point to the second access point.

16. The system of claim 15, wherein the mobile node scans for the second access point when the first strength of connection reaches a predetermined level.

17. The system of claim 15, wherein the one of the beacon and probe response has a frame header and a frame body, the frame header including a source and destination Medium Access Control (MAC) addresses, and the frame body including at least one of a Service Set Identifier (SSID), a timestamp, a transmission interval, a parameter set, the parameter set including IRDP message information which had been extrapolated from the IRDP advertisement, a Registration Lifetime, a home agent flag, and a foreign agent flag.

18. The system of claim 17, wherein the mobile node changes connection from the first access point to the second access point only upon successful authentication of the SSID.

19. A system for real-time handoff in a mobile IP network comprising:

an access point; and
a mobile node,
wherein the access point:
receives at least one service availability communication, wherein the at least one service availability communication includes an IRDP message;
extracts service availability content from the at least one service availability communication,
appends the service availability content into a management packet, the management packet being one of a beacon message and a probe request, wherein the appending of the service availability content into the management packet includes generating a new field in a management frame of the management packet, the new field being populated with the IRDP message, and
transmits the appended management packet including the IRDP message, such that a Layer 3 handoff occurs, and
wherein the mobile node receives the appended management packet, extracts service availability content from the appended management packet, composes a network registration message based upon the extracted service availability content, and transmits the network registration message to the network without waiting for the IRDP message via a Layer 2 handoff.

20. The system of claim 19, wherein the at least one service availability communication includes an IRDP message.

21. The system of claim 19, wherein after the mobile node receives the appended management packet, the mobile node validates the management packet.

22. The system of claim 19, wherein the service availability content includes at least one of: an address of a foreign agent, a Registration Lifetime, a number of Care of Addresses, a Care of Address, a region indicator integer, a home agent flag, and a foreign agent flag.

23. The system of claim 22, wherein the region indicator integer is stored in an object identifier preprogrammed in the associated access point via the at least one service availability advertisement, the region indicator integer representing a specific region of coverage by the associated access point.

24. The system of claim 20, wherein the appending of the service availability content into a management packet includes generating a new field in a management frame of the management packet, the new field being populated with the IRDP message.

25. The system of claim 24, wherein the access point transmits IRDP messages at a further reduced rate to prevent congestion, and wherein a plurality of access points are deployed at and near region boundaries.

26. The system of claim 20, wherein:

after the mobile node receives the appended management packet transmission, validating the at least one rapidly repeated management packet by the mobile node including:

identifying an SSID and a Care of Address in a management frame of the management packet,
confirming that the SSID is valid,
confirming that the Care of Address is an available Care of Address,
wherein if both the SSID and Care of Address are successfully confirmed, then the composing of the network registration message includes generating the SSID and the Care of Address into a new service availability advertisement which is transmitted as the network registration message.

27. The system of claim 26, wherein if at least one of the SSID is confirmed as invalid and the Care of Address is confirmed as unavailable, then the mobile node discards the management packet.

28. The system of claim 26, wherein the transmission of the network registration message involves a registration of location by the mobile node with a home agent of the mobile node via the access point.

29. The system of claim 19, wherein:

after the access point extracts service availability content from the at least one service availability advertisement, then storing the service availability content in a table, the table being at least one of local to the access point, remote to the access point, and composed of a plurality of tables.

30. The system of claim 29, wherein after the mobile node receives the appended management packet transmission, validating the at least one rapidly repeated management packet by the mobile node including:

identifying an SSID and a region indicator integer in a management frame of the management packet,
confirming that the SSID is valid,
confirming that the region indicator integer identifies a new region, wherein the new region associated with the new region indicator integer is different than a current region of the mobile node,
wherein if both the SSID and the region indicator integer are successfully confirmed, then the mobile node uses the region indicator integer to retrieve service availability content associated with the region indicator integer from the table.

31. The system of claim 30, wherein the retrieved service availability content is used to generate a new service availability advertisement to be sent to the mobile node.

32. The system of claim 31, wherein handoff to a new access point in a same region as the mobile node, using the region indicator integer, is effected before handoff to a new access point in a different region than the mobile node.

33. A method for facilitating rapid layer handoffs in a mobile Internet Protocol (IP) network, comprising:
providing an access point;
providing a mobile node, the mobile node being initially connected to a different access point, wherein, the access point:
  receives at least one service availability advertisement;
  extracts service availability content from the at least one service availability advertisement;
  appends the service availability content into at least one rapidly repeated management packet transmission; and
  transmits the appended rapidly repeated management packet transmission,
  the appended rapidly repeated management packet being transmitted more frequently than the at least one service availability advertisement is received;
and the mobile node:
  receives the appended management packet transmission,
  extracts the service availability content from the appended management packet transmission;
  composes a network registration message based upon the extracted service availability content; and
  transmits the network registration message;
  after the access point extracts service availability content from the at least one service availability advertisement, then storing the service availability content in a table, the table being at least one of local to the access point, remote to the access point, and composed of a plurality of tables; and
  after the mobile node receives the appended management packet transmission, validating the at least one rapidly repeated management packet by the mobile node including:
    identifying an SSID and a region indicator integer in a management frame of the management packet,
    confirming that the SSID is valid,
    confirming that the region indicator integer identifies a new region, wherein the new region associated with the new region indicator integer is different than a current region of the mobile node,
    wherein if both the SSID and the region indicator integer are successfully confirmed, then the mobile node uses the region indicator integer to retrieve service availability content associated with the region indicator integer from the table.

34. A system for real-time handoff in a mobile IP network comprising:
an access point;
a mobile node,
wherein the access point receives at least one service availability communication, extracts service availability content from the at least one service availability communication, appends the service availability content into a management packet, the management packet being one of a beacon message and a probe request, and transmits the appended management packet,
wherein the mobile node receives the appended management packet,
extracts service availability content from the appended management packet, composes a network registration message based upon the extracted service availability content, and
transmits the network registration message to the network;
after the access point extracts service availability content from the at least one service availability advertisement, then storing the service availability content in a table, the table being at least one of local to the access point, remote to the access point, and composes of a plurality of tables; and
wherein after the mobile node receives the appended management packet transmission, validating the at least one rapidly repeated management packet by the mobile node including:
  identifying an SSID and a region indicator integer in a management frame of the management packet,
  confirming that the SSID is valid,
  confirming that the region indicator integer identifies a new region, wherein the new region associated with the new region indicator integer is different than a current region of the mobile node,
  wherein if both the SSID and the region indicator integer are successfully confirmed, then the mobile node uses the region indicator integer to retrieve service availability content associated with the region indicator integer from the table.

35. A method for facilitating rapid layer 3 handoffs in a mobile Internet Protocol (IP) network, comprising:
receiving, by an access point, at least one service availability advertisement, wherein the at least one service availability advertisement includes an Internet Control Message Protocol Router Discovery Protocol (IRDP) message;
extracting, by the access point, service availability content from the at least one service availability advertisement;
appending, by the access point, the service availability content into at least one rapidly repeated management packet transmission, wherein the appending of the service availability content into at least one rapidly repeated management packet transmission includes generating a new field in a management frame of the management packet, the new field being populated with the IRDP message;
transmitting, by the access point, the appended rapidly repeated management packet transmission to a mobile node, the appended rapidly repeated management packet including the IRDP message being transmitted more frequently than the at least one service availability advertisement is received, such that the rapid Layer 3 handoff occurs; and
receiving, by the access point, a network registration message from the mobile node without waiting for the IRDP message via a Layer 2 handoff, the network registration message is composed based on the service availability content extracted from the appended rapidly repeated management packet transmission;
wherein the mobile node is not initially connected to the access point.

36. The method of claim 35, wherein the at least one service availability advertisement indicates soon-entry from a first layer 2 region to a second layer 2 region, the second layer 2 being associated with the access point, the first and second layer 2 regions being different.

37. The method of claim 35, wherein the service availability content includes at least one of: an address of a foreign agent, a Registration Lifetime, a number of Care of Addresses, at least one Care of Address, a region indicator integer, a home agent flag, and a foreign agent flag.

38. The method of claim 37, wherein the region indicator integer is stored in an object identifier preprogrammed in the associated access point via the at least one service availability advertisement, the region indicator integer representing a specific region of coverage by the associated access point.

39. The method of claim 35, wherein the at least one rapidly repeated management packet is one of a beacon message and a probe response.

40. The method of claim 39, wherein the access point transmits IRDP messages at a further reduced rate.

41. The method of claim 35, further comprising:
after the access point extracts service availability content from the at least one service availability advertisement, then storing the service availability content in a table, the table being at least one of local to the access point, remote to the access point, and composed of a plurality of tables.

42. A method for facilitating rapid layer 3 handoffs in a mobile Internet Protocol (IP) network, comprising:
receiving, by a mobile node, an appended rapidly repeated management packet transmission;
extracting, by the mobile node, a service availability content from the appended rapidly repeated management packet transmission, wherein the service availability content was previously extracted from at least one service availability advertisement including an Internet Control Message Protocol Router Discovery Protocol (IRDP) message before being appended into at least one rapidly repeated management packet transmission which included a generation of a new field in a management frame of the management packet, the new field being populated with the IRDP message, the appended rapidly repeated management packet including the IRDP message being transmitted at a frequency such that the rapid Layer 3 handoff from an access point to the mobile node occurs;
composing, by the mobile node, a network registration message based upon the extracted service availability content; and
transmitting, by the mobile node, the network registration message without waiting for the IRDP message via a Layer 2 handoff;
wherein the mobile node being initially connected to a different access point.

43. The method of claim 42, wherein the at least one service availability advertisement indicates soon-entry from a first layer 2 region to a second layer 2 region, the second layer 2 being associated with the access point, the first and second layer 2 regions being different.

44. The method of claim 42, further comprising:
after the mobile node receives the appended management packet transmission, validating the at least one rapidly repeated management packet by the mobile node.

45. The method of claim 42, wherein the service availability content includes at least one of: an address of a foreign agent, a Registration Lifetime, a number of Care of Addresses, at least one Care of Address, a region indicator integer, a home agent flag, and a foreign agent flag.

46. The method of claim 42, wherein the at least one rapidly repeated management packet is one of a beacon message and a probe response.

47. The method of claim 46, further comprising:
after the mobile node receives the appended management packet transmission, validating the at least one rapidly repeated management packet by the mobile node including:
identifying an SSID and a Care of Address in a management frame of the management packet,
confirming that the SSID is valid,
confirming that the Care of Address is an available Care of Address,
wherein if both the SSID and Care of Address are successfully confirmed, then the composing of the network registration message includes generating the SSID and the Care of Address into a new service availability advertisement which is transmitted as the network registration message.

48. The method of claim 47, wherein if at least one of the SSID is confirmed as invalid and the Care of Address is confirmed as unavailable, then the mobile node discards the management packet.

49. The method of claim 47, wherein the transmission of the network registration message involves a registration of location by the mobile node with a home agent of the mobile node via the access point.

* * * * *